United States Patent
Moisin

(10) Patent No.: US 6,936,977 B2
(45) Date of Patent: Aug. 30, 2005

(54) BALLAST CIRCUIT HAVING ENHANCED OUTPUT ISOLATION TRANSFORMER CIRCUIT WITH HIGH POWER FACTOR

(76) Inventor: Mihail S. Moisin, 8 Druce St., Brookline, MA (US) 02245

( * ) Notice: Subject to any disclaimer, the term of this patent is extended or adjusted under 35 U.S.C. 154(b) by 0 days.

(21) Appl. No.: 10/701,033

(22) Filed: Nov. 4, 2003

(65) Prior Publication Data

US 2004/0090800 A1 May 13, 2004

Related U.S. Application Data

(63) Continuation-in-part of application No. 10/055,136, filed on Jan. 23, 2002, now Pat. No. 6,674,246.

(51) Int. Cl.[7] .............................................. H05B 41/16
(52) U.S. Cl. ........................ 315/282; 315/274; 315/278
(58) Field of Search ................................. 315/282, 274, 315/278, 279, 257, 246, 291, 307

(56) References Cited

U.S. PATENT DOCUMENTS

| | | |
|---|---|---|
| 3,859,555 A | 1/1975 | Latassa et al. |
| 4,580,013 A | 4/1986 | Moisin |
| 4,829,567 A | 5/1989 | Moisin |
| 4,864,609 A | 9/1989 | Moisin |
| 4,922,531 A | 5/1990 | Moisin |
| 5,014,305 A | 5/1991 | Moisin |
| 5,052,039 A | 9/1991 | Moisin |
| 5,081,401 A | 1/1992 | Moisin |
| 5,124,619 A | 6/1992 | Moisin et al. |
| 5,138,233 A | 8/1992 | Moisin et al. |
| 5,138,234 A | 8/1992 | Moisin |
| 5,138,236 A | 8/1992 | Bobel et al. |
| 5,144,195 A | 9/1992 | Konopka et al. |
| 5,148,087 A | 9/1992 | Moisin et al. |
| 5,220,247 A | 6/1993 | Moisin |
| 5,332,951 A | 7/1994 | Turner et al. |
| 5,583,402 A | 12/1996 | Moisin et al. |
| 5,608,295 A | 3/1997 | Moisin |
| 5,686,799 A | 11/1997 | Moisin et al. |
| 5,691,606 A | 11/1997 | Moisin et al. |
| 5,798,617 A | 8/1998 | Moisin |
| 5,821,699 A | 10/1998 | Moisin |
| 5,866,993 A | 2/1999 | Moisin |
| 5,877,926 A | 3/1999 | Moisin |
| 5,925,986 A | 7/1999 | Moisin |
| 5,955,841 A | 9/1999 | Moisin et al. |
| 5,982,111 A | 11/1999 | Moisin |
| 6,011,362 A | 1/2000 | Moisin |
| 6,020,688 A | 2/2000 | Moisin |
| 6,028,399 A | 2/2000 | Moisin |
| 6,037,722 A | 3/2000 | Moisin |
| 6,051,936 A | 4/2000 | Qian |
| 6,069,455 A | 5/2000 | Moisin |
| 6,091,288 A | 7/2000 | Moisin |
| 6,100,645 A | 8/2000 | Moisin |
| 6,100,648 A | 8/2000 | Moisin |
| 6,107,750 A | 8/2000 | Moisin |
| 6,122,182 A | 9/2000 | Moisin |
| 6,127,786 A | 10/2000 | Moisin |
| 6,137,233 A | 10/2000 | Moisin |
| 6,157,142 A | 12/2000 | Moisin |

(Continued)

*Primary Examiner*—Tuyet Thi Vo
(74) *Attorney, Agent, or Firm*—Daly, Crowley, Mofford & Durkee, LLP

(57) ABSTRACT

A ballast circuit includes an output isolation transformer having a primary winding and first and second secondary terminals coupled to opposing ballast lamp terminals for additively applying potentials on the primary winding and the first and second secondary winding potentials across the lamp and limiting ground fault voltages. The circuit can include a closed loop feedback path from a load to a feedback rectifier for promoting linear operation of an input rectifier.

36 Claims, 12 Drawing Sheets

U.S. PATENT DOCUMENTS

| | | |
|---|---|---|
| 6,160,358 A | 12/2000 | Moisin |
| 6,169,375 B1 | 1/2001 | Moisin |
| 6,181,082 B1 | 1/2001 | Moisin |
| 6,181,083 B1 | 1/2001 | Moisin |
| 6,188,553 B1 | 2/2001 | Moisin |
| 6,194,843 B1 | 2/2001 | Moisin |
| 6,222,326 B1 | 4/2001 | Moisin |
| 6,236,168 B1 | 5/2001 | Moisin |
| 6,281,638 B1 | 8/2001 | Moisin |
| 6,459,216 B1 * | 10/2002 | Tsai ............................ 315/294 |
| 2002/0011806 A1 | 1/2002 | Moisin |
| 2002/0030451 A1 | 3/2002 | Moisin |
| 2003/0160571 A1 | 8/2003 | Moisin |

* cited by examiner

BALLAST CIRCUIT HAVING ENHANCED OUTPUT ISOLATION TRANSFORMER CIRCUIT WITH HIGH POWER FACTOR

CROSS REFERENCE TO RELATED APPLICATIONS

The present application is a continuation in part of U.S. patent application Ser. No. 10/055,136 filed on Jan. 23, 2002, now U.S. Pat. No. 6,674,246 which is incorporated herein by reference.

STATEMENT REGARDING FEDERALLY SPONSORED RESEARCH

Not Applicable.

FIELD OF THE INVENTION

The present invention relates generally to electrical circuits and, more particularly, to resonant inverter circuits.

BACKGROUND OF THE INVENTION

There are many types of circuits for powering a load. One such circuit is a resonant inverter circuit, which receives a direct current (DC) signal, from a rectifier for example, and outputs an alternating current (AC) signal. Resonant inverter circuits are used in a wide variety of devices, such as lamp ballasts. The AC output can be coupled to a load, such as a fluorescent lamp, or to a rectifier so as to form a DC-DC converter.

Resonant inverter circuits can have a variety of configurations. For example, a half-bridge inverter circuit includes first and second switching elements, such as transistors, coupled in a half-bridge configuration. A full-bridge inverter circuit includes four switching elements coupled in a full-bridge configuration. Half-bridge and full-bridge inverter circuits are typically driven at a characteristic resonant frequency determined by the impedance values of the various circuit elements, including a resonant inductive element.

Conventional ballast circuits typically include an output transformer inductively coupled to the resonant inductive element for isolating lamps from the resonant circuit. The output transformer is a well known configuration for meeting applicable Underwriters Laboratories (UL) lamp ballast ground fault standards. In general, the current from the ballast lamp terminals is limited to a predetermined level with respect to ground. By limiting the current, a person touching the lamp terminal so as to form a path to ground through the person's body is not electrocuted.

FIG. 1 shows a typical prior art ballast circuit 10 having a conventional output isolation transformer 12. A rectifier/filter 14 receives an AC input signal on first and second input terminals 16a,b and provides positive and negative voltage rails 18, 20. Inductively coupled inductors L1-A, L1-B can be provided on the respective positive and negative rails 18, 20. First and second switching elements 22, 24 are coupled across the rails in a well known half-bridge configuration. A primary winding 26, e.g., 1.5 mH 50 turns, of the output isolation transformer combines with a resonating capacitor 28 to form a parallel resonating circuit. A secondary winding 30, e.g., 100 turns, of the transformer energizes first and second lamps LP1, LP2 each of which is coupled in series with respective lamp capacitors CL1, CL2. In this well known configuration, the secondary winding 30 of the transformer isolates the lamp terminals from the resonating circuit so as to limit the ground fault current flow. In the event a technician inadvertently touches a lamp terminal and thereby provides a current path to ground, the current flow through the technician's body is limited to a safe level to prevent injury. Underwriter's Laboratories promulgates standards for acceptable ballast ground fault current levels.

While the output isolation transformer provides safety, it is relatively bulky so as to require significant space on the ballast circuit board. The output transformer also consumes a relatively high amount of power. In addition, the transformer performance is negatively impacted in some applications by the corona effect. For example, in so-called instant start ballasts, in which a relatively high voltage, e.g., 500 VRMS, is applied to the lamp terminals to initiate current flow through the lamp, the transformer must provide this voltage to strike the lamp. Such a voltage can cause the transformer operating characteristics to degrade over time.

It would, therefore, be desirable to provide a ballast circuit having an enhanced output isolation configuration.

SUMMARY OF THE INVENTION

The present invention provides a circuit including a resonant inverter having a relatively efficient and reliable output isolation transformer circuit. In general, the output isolation transformer includes at least one secondary winding that combines with the primary winding to provide the required lamp strike voltage while limiting ground fault current from the lamp terminals. With this arrangement, the required voltages are efficiently applied to the lamps to initiate current flow without compromising safety, e.g., meeting applicable ballast safety standards. While the invention is primarily shown and described in conjunction with ballast circuits, it is understood that the invention is applicable to other circuits, such as power supplies and electrical motors, in which it is desirable to isolate a load and limit ground fault current.

In one aspect of the invention, a resonant circuit includes an output isolation output transformer having a first secondary winding coupled to one of the lamp terminals. A primary winding of the transformer provides a series circuit path with the first secondary windings such that a node at AC ground is disposed between the primary winding and the first secondary winding. The primary winding of the output isolation transformer can also provide an inductor forming a part of the resonating circuit. Further secondary windings can be provided as desired.

In one particular embodiment, a second secondary winding is coupled between the primary winding and the lamp. The voltage across the first secondary winding is applied to one end of the lamp and the voltages across the second secondary winding and the primary winding are applied to the other end of the lamp. The ground fault voltage from a first lamp terminal corresponds to the voltage of the first secondary winding and the ground fault voltage from the second lamp terminal corresponds to the combined voltages of the second secondary winding and the primary winding.

In another aspect of the invention, the circuit includes a feedback path from a point proximate the lamp for reducing harmonic distortion and increasing overall efficiency. In an exemplary embodiment, the circuit includes a feedback path from a closed current loop including a transformer winding to a high frequency rectifier for promoting linear operation of a low frequency input rectifier.

In a further aspect of the invention, a resonant circuit includes an output isolation transformer having a primary winding providing a resonant inductive element for the resonant circuit, a first secondary winding and a feedback secondary winding. A balance inductor has one end coupled to the first secondary winding and the other end coupled to the feedback secondary winding. Load terminal pairs can include one terminal coupled to an optional second secondary winding and the other terminal coupled to the balance inductor and the feedback secondary winding.

In one embodiment, the first and feedback secondary windings having substantially equal impedances that substantially cancel each other. The balance inductor then provides a corrected, e.g., substantially proportional feedback signal to a rectifier circuit, for example, via the feedback secondary winding.

In another aspect of the invention, the resonant circuit, which be provided as a ballast circuit, includes first, second and third input terminals and first and second lamp group control circuits. Based upon whether a first input signal is present on the second input terminal, the first lamp group control circuit controls the activation of a first group of lamps. Similarly, based upon whether a second input signal is present on the third input terminal, the second lamp group control circuit controls the activation of a second group of lamps. The ballast circuit provides independent control of first and second groups of lamps, which can be located in a single lighting fixture.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 2:
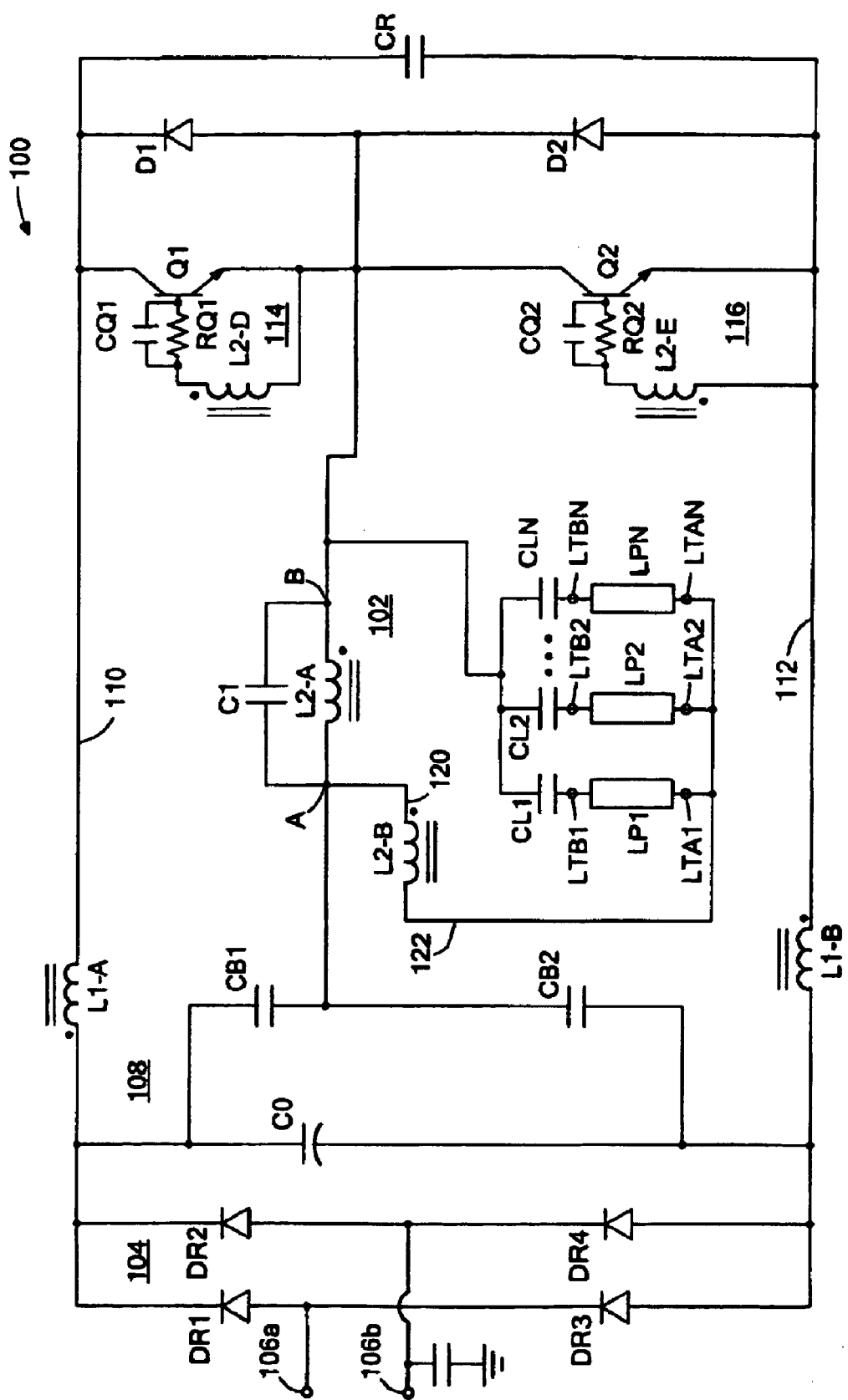
FIG. 2 is a circuit diagram of an exemplary implementation of a resonant circuit having an output isolation transformer for limiting ground fault current in accordance with the present invention.

FIG. 2 shows an exemplary circuit implementation of a lamp ballast 100 having an enhanced output isolation transformer 102 configuration in accordance with the present invention. In general, the output isolation transformer 102 provides efficient, flexible operation while limiting ground fault current to safe levels. More particularly, a first secondary winding L2-B of the output isolation transformer, as well as the primary winding L2-A, are coupled to the lamp terminals to provide desired strike voltages while limiting the lamp voltage level with respect to ground, as described more fully below.

The ballast 100 includes a rectifier 104 shown having a full bridge configuration provide by bridge diodes DR1-4. First and second input terminals 106a,b receive an AC input signal, such as a standard 110 VRMS, 60 Hz signal. A conventional filter stage 108 includes inductively coupled first and second inductive elements L1-A, L1-B, a filter capacitor C0, and first and second bridge capacitors CB1, CB2 coupled as shown.

The first and second inductive elements L1-A, L1-B, operate to limit current in the event cross conduction occurs, i.e., the switching elements Q1, Q2 are conductive at the same time.

The first and second switching elements Q1, Q2, which are shown as transistors, are coupled in a conventional half-bridge configuration across the positive and negative voltage rails 110,112 of the inverter. The conduction states of the first and second switching elements Q1, Q2 are controlled by respective first and second control circuits 114,116. In one particular embodiment, the first control circuit 114 includes an inductive element L2-D inductively coupled to the primary winding L2-A of the resonating output isolation transformer 102. The inductive element L2-D, in combination with a capacitor CQ1 and resistor RQ1, periodically bias the first switching element Q1 to the conductive state to achieve resonant circuit operation. The second control circuit 116 can have a similar configuration to that of the first control circuit 114. This control circuit arrangement is well known to one of ordinary skill in the art. In addition, a variety of alternative control circuits will be readily apparent to one skilled in the art. Resonant inverter operation is well known to one of ordinary skill in the art.

The primary winding L2-A of the output isolation transformer 102 is coupled in parallel with a resonating capacitor C1 to form a parallel resonating inverter circuit configuration. A first secondary winding L2-B of the output isolation transformer 102 has a first terminal 120 coupled to the primary winding L2-A and a second terminal 122 coupled to a series of lamp terminals LTA1-N. These lamp terminals LTA1-N, along with lamp terminals LTB1-N on the opposite end of the lamps LP1-N, are adapted for providing an electrical connection to lamps inserted into the lamp terminals.

In operation, the first secondary winding L2-B and the primary winding L2-A combine to provide a voltage, e.g., 500 VRMS, that is sufficient to enable instant start lamp operation while limiting the voltage from a lamp terminal to ground. More particularly, the strike voltage applied across the lamps LP1-N can be budgeted, e.g., about evenly split, between the primary winding L2-A and the first secondary winding L2-B. It is well known in the art that about half of the strike voltage is not enough to trigger the lamp ionization. Therefore, by applying that voltage across the lamp, the lamp current is limited to safe values. By splitting the transformer voltage, the potential from a lamp terminal to AC ground at node A corresponds to the potential on the windings connected between that lamp terminal and node A. This arrangement limits the ground fault current from the lamp terminals while safely enabling the generation of relatively high strike voltages for starting the lamp.

Figure 3:
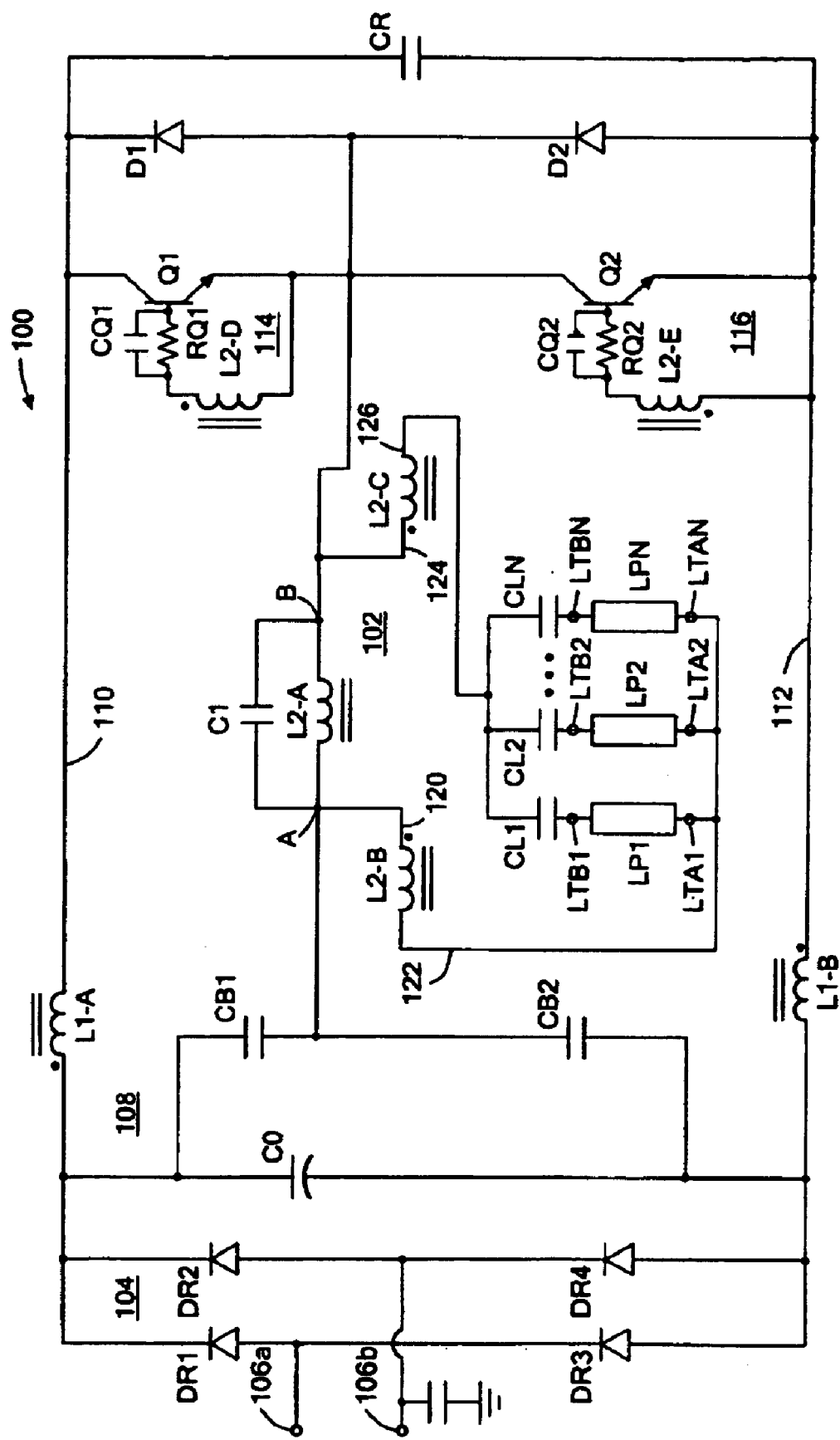
FIG. 3 is a circuit diagram showing a further implementation of a resonant circuit having an output isolation transformer for limiting ground fault current in accordance with the present invention.

In an exemplary embodiment shown in FIG. 3, the circuit includes a second secondary winding L2-C for further apportioning the available voltage budget. In one particular embodiment, the second secondary winding L2-C of the transformer has a first terminal 124 coupled to an opposite end of the transformer primary winding L2-A and a second terminal 126 coupled to respective lamp capacitors CL1-N, which are coupled in series with the lamps LP1-N.

The first node A provides AC ground at one side of the transformer primary winding L2-A. The potential from the first lamp terminal LTA1 to the first node A (AC ground) corresponds to the voltage across the first secondary winding L2-B. Similarly, the potential from the second lamp terminal LTB1 to AC ground (node A) corresponds to the voltages across the second secondary winding L2-C and the primary winding L2-A.

In one particular embodiment (not shown) the polarity of the second secondary winding L2-C can be reversed to reduce the voltage from the primary winding L2-A that is applied to the lamps.

It will be readily apparent to one of ordinary skill in the art that further secondary windings having desired polarities can be disposed throughout the circuit to meet the needs of a particular application. In addition, one of ordinary skill in the art will appreciate that the primary winding can be split into two or more windings to which various secondary windings can be coupled.

In general, the turn ratios of the first and second secondary windings L2-B, L2-C and the primary winding L2-A can be selected to budget the lamp strike voltage as desired since the winding voltages are additively applied across the lamps. Thus, the output isolation transformer circuit of the present invention provides the flexibility to control the voltages generated on the windings. For example, a combined potential of 750 VRMS can be generated on the primary and secondary windings to strike and eight foot lamp. The 750 VRMS can be safely generated by dividing the voltage between the primary and secondary windings with respect to AC ground. It is understood that the strike voltage can be apportioned among the windings as desired. In addition, the 750 VRMS can be provided by the transformer with minimal corona effects in comparison to the prior art circuit shown in FIG. 1.

Table 1 shows exemplary circuit characteristics for various circuit components shown in FIG. 3. It is understood that one of ordinary skill in the art can readily vary the component characteristics to meet the needs of a particular application without departing from the invention.

| COMPONENT | IMPEDANCE | TURNS |
|---|---|---|
| C1 | 1 nF | — |
| L2-A | 1.5 mH | 50 Turns |
| L2-B | 1.8 mH | 55 Turns |
| L2-C | .015 mH | 5 Turns |
| CL1-N | 1 nF | — |
| L2-C, L2-D | | 1 Turn |
| CQ1, CQ2 | 0.1 μF | — |
| RQ1, RQ2 | 47 Ω | — |
| L1-A, L1-B | 1 mH | 100 Turns |
| C0 | 100 μF | — |
| CB1, CB2 | 1.0 μF | — |
| CR | 1.0 nF | — |

It is understood that one of ordinary skill in the art will recognize alternative embodiments having additional secondary windings connected to the lamps and/or additional primary windings to meet the needs of a particular application without departing from the invention. Moreover, it is understood that the invention is applicable to a wide range of circuits and devices in which it is desirable to provide efficient, flexible output isolation. Exemplary circuits and devices include lamp ballasts, electrical motors, and power supplies.

In another aspect of the invention, a resonant circuit includes a feedback path from a load to a multi-bridge rectifier for enhancing power factor (PF) and total harmonic distortion (THD) performance of the circuit. In general, a closed loop circuit path from a transformer winding and the load to a point in the multi-bridge rectifier promotes linear operation of the input rectifier diodes.

Figure 4:
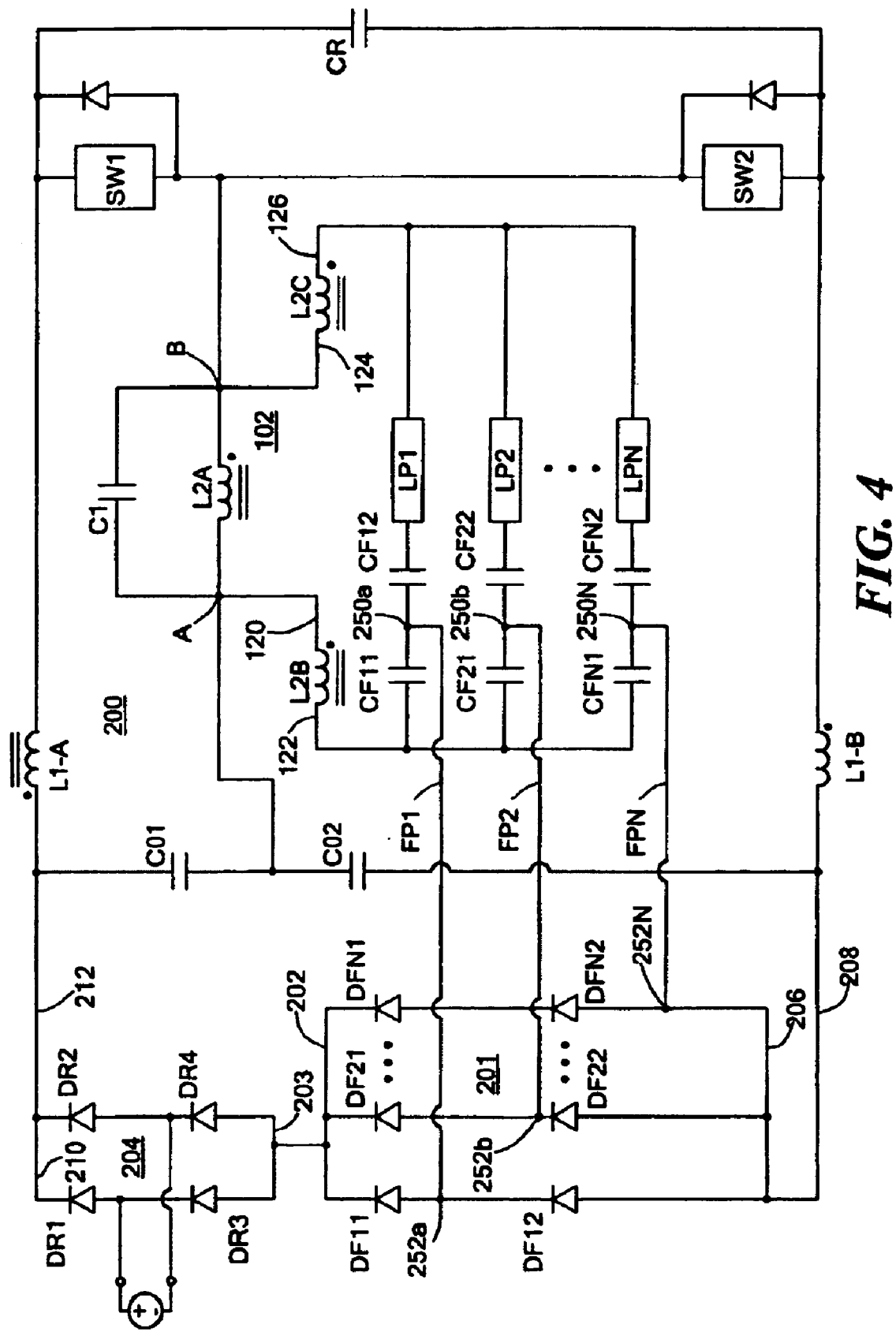
FIG. 4 is a circuit diagram showing a resonant circuit having a load feedback path in accordance with the present invention and FIG. 5 is a graphical depiction of rectifier diode operation provided by the circuit of FIG. 4.

FIG. 4 shows an exemplary resonant circuit 201 having power feedback in accordance with the present invention. A multi-bridge rectifier 201 includes pairs (DF11, DF12), (DF21, DF22), . . . (DFN1, DFN2) of rectifying diodes coupled ene-to end. A top 202 of the multi-bridge rectifier 201 is coupled to a bottom 203 of a low frequency input rectifier 204 and a bottom 206 of the multi-bridge rectifier is coupled to a negative rail 208 of the inverter. A top of the input rectifier 210 is coupled to the positive rail 212 of the inverter.

In one particular embodiment, the resonant circuit 200 is provided as a resonant inverter circuit having a topology similar to that shown in FIG. 3, in which like elements have like reference designations. The circuit further includes a first series load path extending from the first secondary winding terminal 122 to the second secondary winding terminal 126. The first series load path includes first and second feedback capacitors CF11, CF12 coupled in a DC-blocking arrangement and terminals for energizing a first load, such as a first lamp LP1. The circuit 200 can include a number of similar load paths having respective pairs of feedback capacitors (CF21, CF22), . . . (CFN1, CFN2), for energizing additional lamps LP2, . . . LPN.

A first feedback path FP1 extends from a point 250a between the first and second feedback capacitors CF11, CF12, to a point 252a between a first pair DF11, DF12 of diodes in the multi-bridge rectifier 201. Similarly, additional feedback paths FP2, . . . FPN can extend from respective points 250b-N between the feedback capacitor pairs and points 252b-N between the diode pairs in the multi-bridge rectifier 201.

In operation, the aggregate voltage drops, with respect to AC ground at point A, across the first secondary winding L2B and the first feedback capacitor CF1 are applied to the point 252a between the first pair of diodes DF11, DF12 in the multi-bridge rectifier 201. The relatively high frequency constant amplitude signal on the first feedback path FP1 periodically biases the first diode pair (DF11, DF12) to a conductive state; which in turn biases a pair of input rectifier diodes, e.g., DR1, DR3, to a conductive state.

Figure 5:
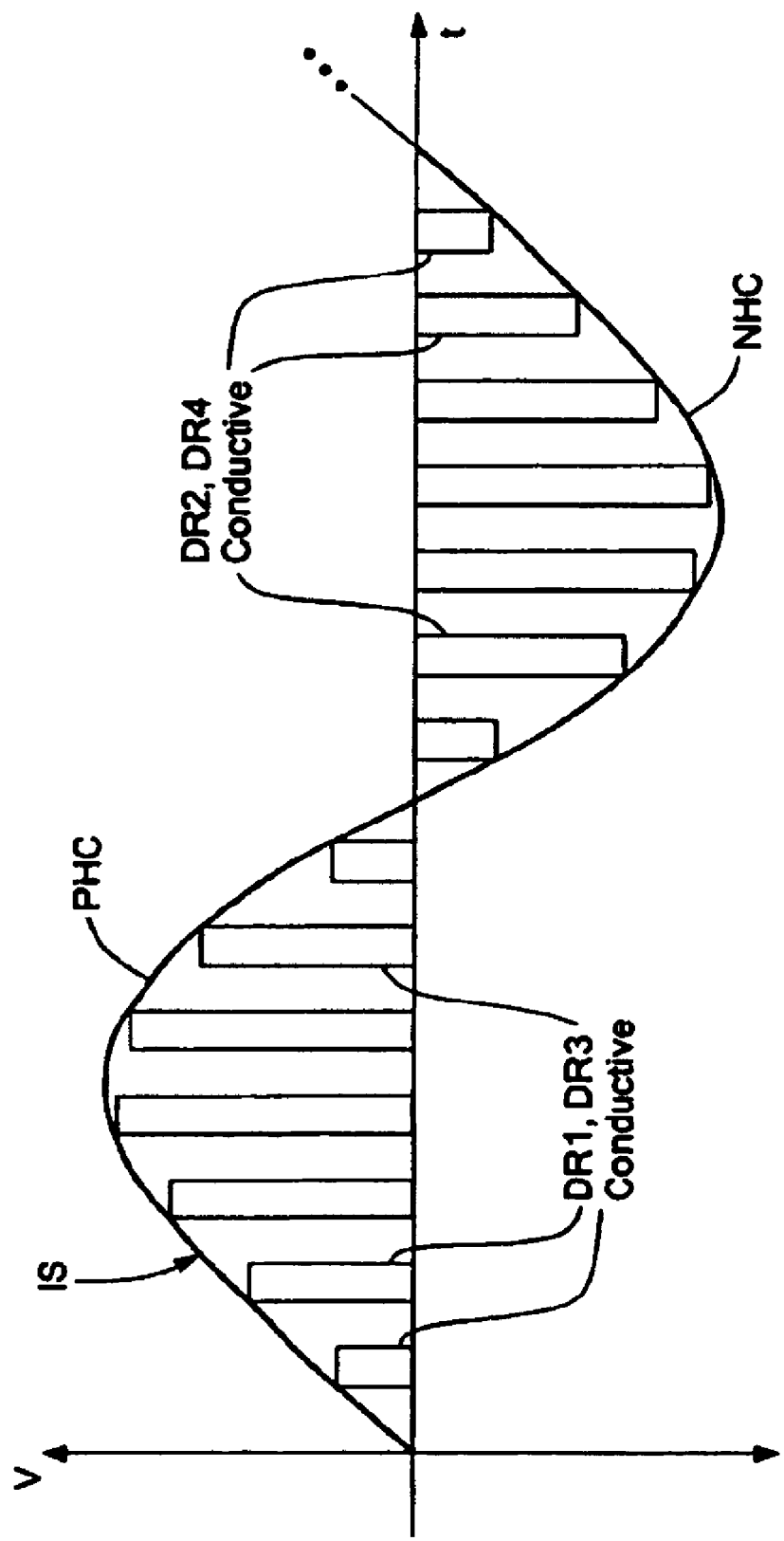

As shown in FIG. 5, the high frequency signal on the first feedback path FP1, via the multi-bridge rectifier 201, periodically biases the first diode pair DR1, DR3 of the input rectifier 204 to the conductive state during a positive half cycle PHC of the relatively low frequency input signal IS. Similarly, the second diode pair DR2, DR4 of the input rectifier is periodically conductive during a negative half cycle NHC of the input signal IS.

With this arrangement, the first storage capacitor C01 can be efficiently energized during positive half cycles of the input signal IS and the second storage capacitor C02 energized during negative half cycles. Thus, the linear operation of the input rectifier diodes provides a more efficient circuit as compared with circuits not having linear diode operation.

In addition, each feedback path FP1-N provides independent power feedback depending upon the presence of a functioning lamp. That is, the first feedback path FP1 provides substantial feedback energy when the first lamp LP1 is present and operational. If the first lamp is not present or not functioning, then the first feedback signal generally corresponds to the energy from the first secondary winding L2B of the transformer. However, it is understood that the bulk of the feedback energy comes from an operational lamp. Thus, the circuit provides self-optimizing feedback signals'such that the feedback energy is based upon whether the respective load is present.

In conventional circuits having feedback paths for promoting linear diode operation, the feedback signal is typically present whether or not the load is present. The injection of feedback energy into the circuit without the load can stress the circuit and degrade performance.

Figure 1:
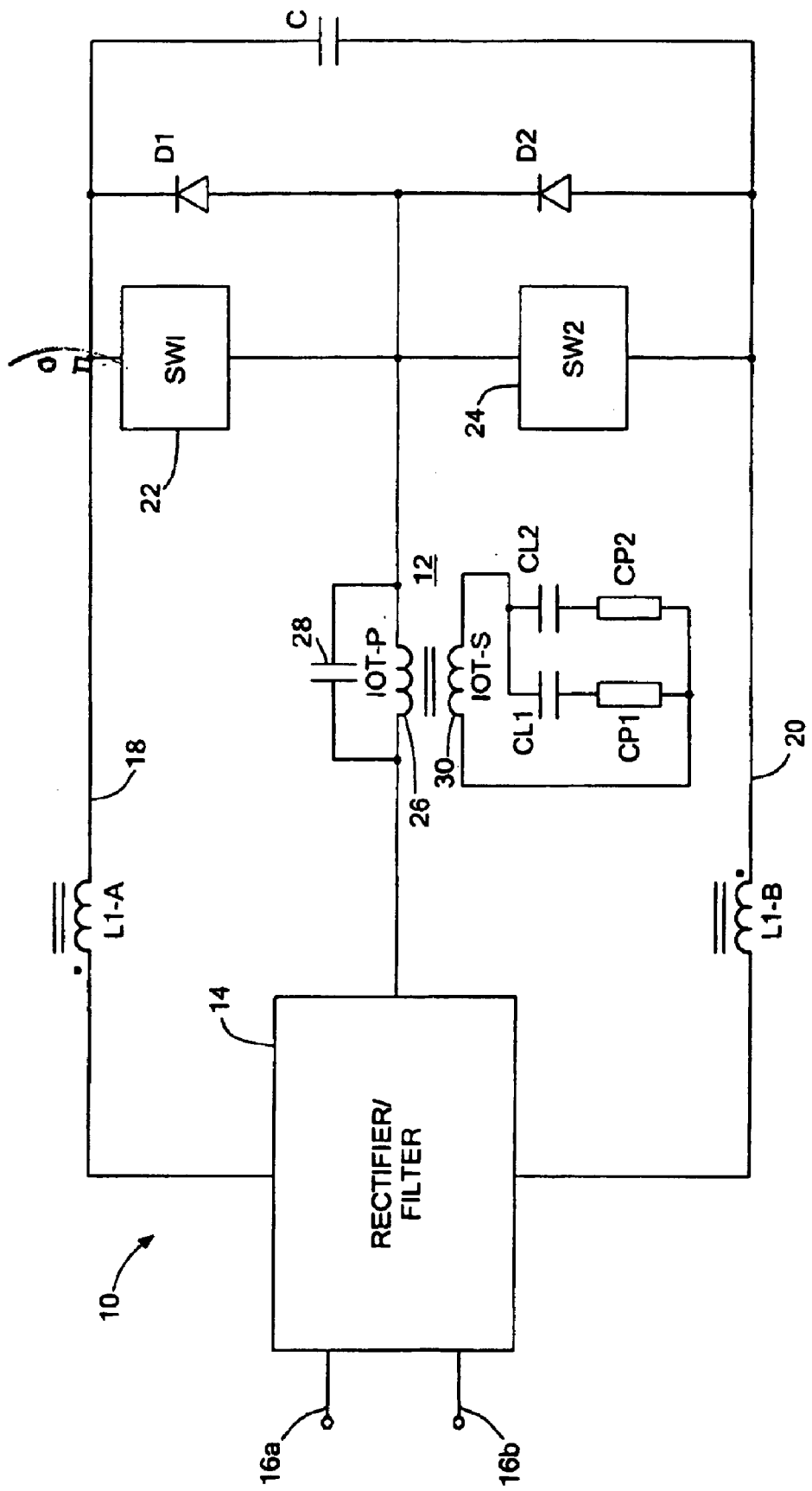
FIG. 1 is a schematic block diagram of a prior art ballast circuit.

While the feedback circuit of the present invention is primarily shown and described in conjunction with a particular circuit topology, it is understood that the feedback arrangement is applicable to a variety of resonant circuits having a closed current path from the primary transformer winding. That is, the load is not isolated from the resonant circuit, such as by using a conventional output isolation transformer as shown in FIG. 1.

In addition, the independent feedback path arrangement enables the circuit to energize a variety of loads having differing operating characteristics. For example, the circuit 200 can energize lamps having varying lengths. Each feedback path provides the "right" amount of feedback energy for enhanced PF and THD performance.

While bipolar transistors are shown for the switching elements in the exemplary embodiments contained herein, it is understood that a variety of switching elements and switching control circuits can be used without departing from the invention. Illustrative switching elements include transistors, such as bipolar junction transistors and field effect transistors, SCRs, and the like.

It is further understood that various inverter configurations can be used depending upon the requirements of a particular application. For example, half-bridge, full bridge, single switching element, and other inverter configurations known to one of ordinary skill in the art can be used.

Figure 6:
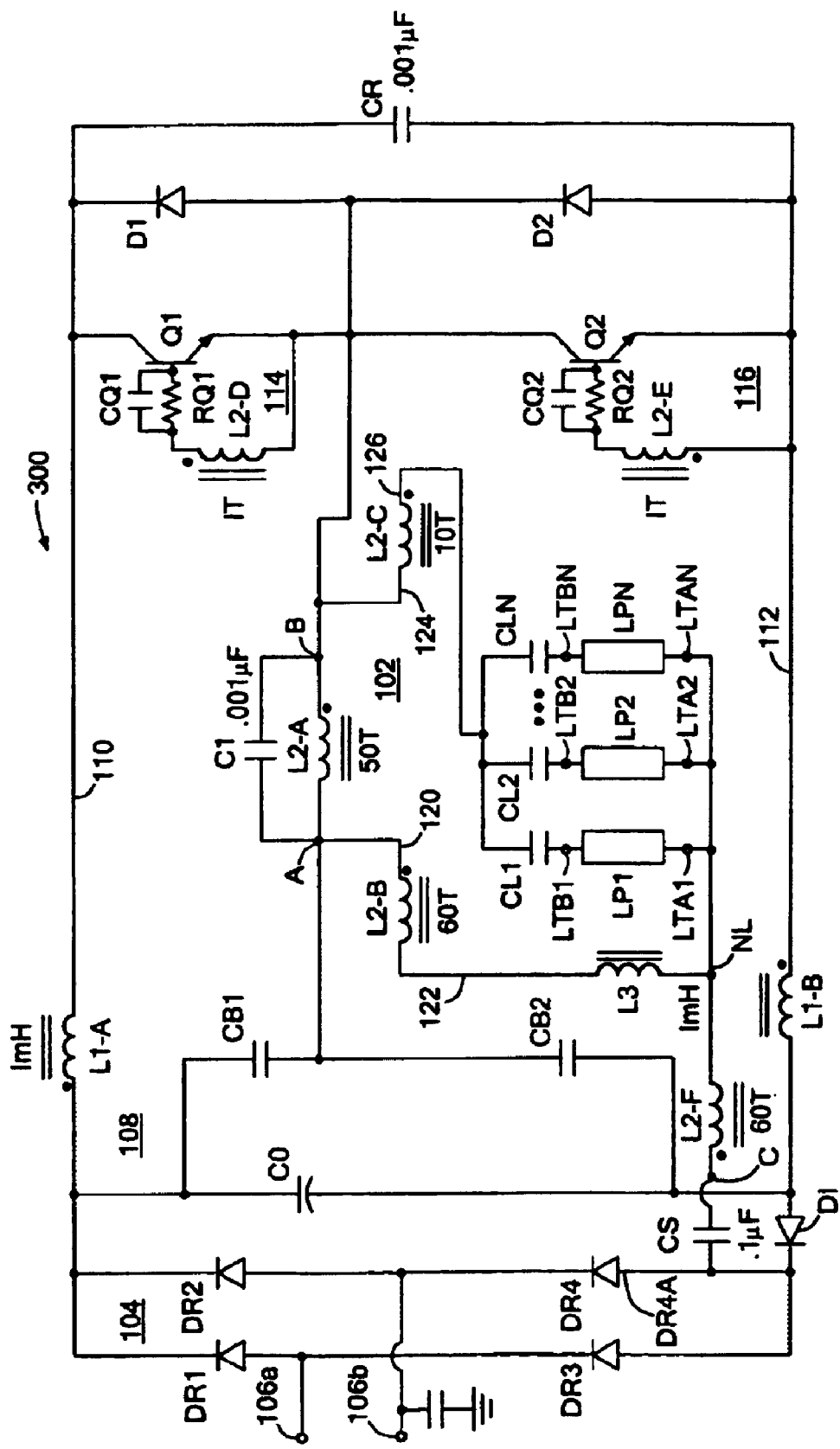
FIG. 6 is a schematic depiction of a resonant circuit having a balanced load feedback path in accordance with the present invention.

FIG. 6 shows a resonant circuit 300 having a balanced feedback signal in accordance with the present invention. The circuit 300 has certain similarities with FIG. 3 in which like reference numbers indicate like elements. In general, the feedback signal from the split resonating inductor is balanced to enhance the total harmonic distortion (THD) of the circuit.

As described above, an output isolation transformer 102 includes a primary winding L2-A, a first secondary winding L2-B and an optional second secondary winding L2-C coupled as shown with polarities indicated with conventional dot notation. A third secondary (feedback) winding L2-F is coupled in series with an optional DC blocking series capacitor CS. Note that secondary windings L2-D, L2-E form part of the control circuits 114, 116 for the first and second switching elements Q1, Q2. The series capacitor CS is coupled to the anode DR4A of the fourth rectifying diode DR4 and the feedback secondary winding L2-F is coupled to a node NL formed by the lamp terminals LTA1, LTA2, ... LTAN. Node C, which provides an AC ground like node A in the absence of any load current, is located between the feedback secondary winding L2-F and the series capacitor CS. An isolation diode DI is couple between the third bridge diode DR3 and the second inductive element L1-B.

The circuit 300 further includes a balance inductor L3 coupled between the first secondary winding L2-B and the lamp terminal node NL.

In an exemplary embodiment, the first secondary winding L2-B and the feedback secondary winding L2-F have about the same impedance. With the polarities indicated with conventional dot notation, it can be seen that the voltages generated by the first and feedback secondary windings L2-B, L2-F substantially cancel each other. The impedance of the balance inductor L3 is selected so as to generate a potential proportional to the load current that can be supplied to the bridge 104 to provide a desired feedback signal. That is, splitting of the output isolation transformer 102 to meet UL requirements may result in a voltage across the first primary winding L2-B that degrades Total Harmonic Distortion (THD). It can be seen that the voltage at node C is about the same voltage as at node A, in the absence of any load current, which as described above, provides an AC ground.

Figure 6A:
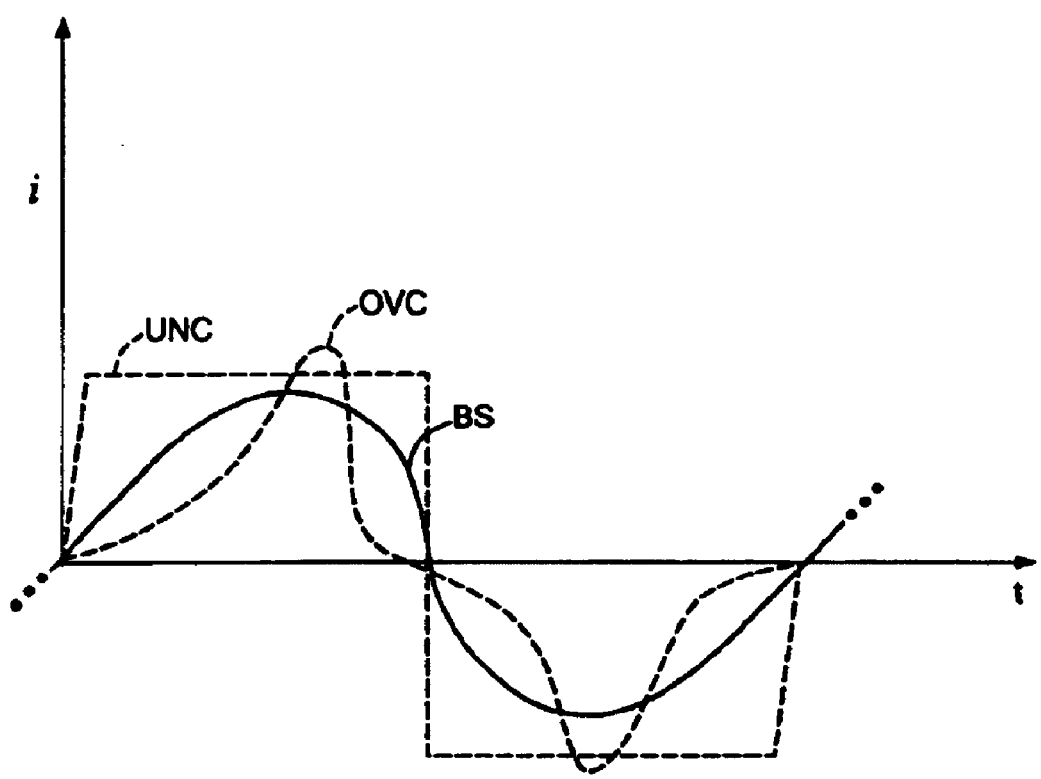
FIG. 6A is a graphical depiction of an exemplary feedback signal that can be provided by the circuit of FIG. 6.

FIG. 6A shows an overcompensated feedback current signal OVC, an under-compensated signal UNC, and a balanced signal BS, which is substantially sinusoidal as desired. The balance inductor L3 facilitates the generation of a feedback signal BS proportional to the load current.

With the arrangement of FIG. 6, the balance inductor L3 'reads' the current through the lamps LP1, LP2, ... LPN and supplies a voltage to the bridge 104 resulting in a substantially corrected (sinusoidal) line current. The feedback current is proportional to the input current, which is proportional to the load current. Of course, as the load current changes, the input current changes. The balance inductor L3 provides a feedback signal that is proportional to the load current. Thus, as one or more lamps are added or removed, which changes the load current, the feedback current changes proportionally so as to perform correction on the feedback signal, e.g., generate a desired sinusoidal line current waveform.

In another aspect of the invention, the impedance values of the balance inductor L3 and the series capacitor CS can be selected so as to provide a series resonating effect. The series resonating circuit provides a lower impedance feedback path as the operating frequency approaches the resonating frequency, thus allowing for fine-tuning of the proportional relationship between the feedback current and the input current.

Figure 7:
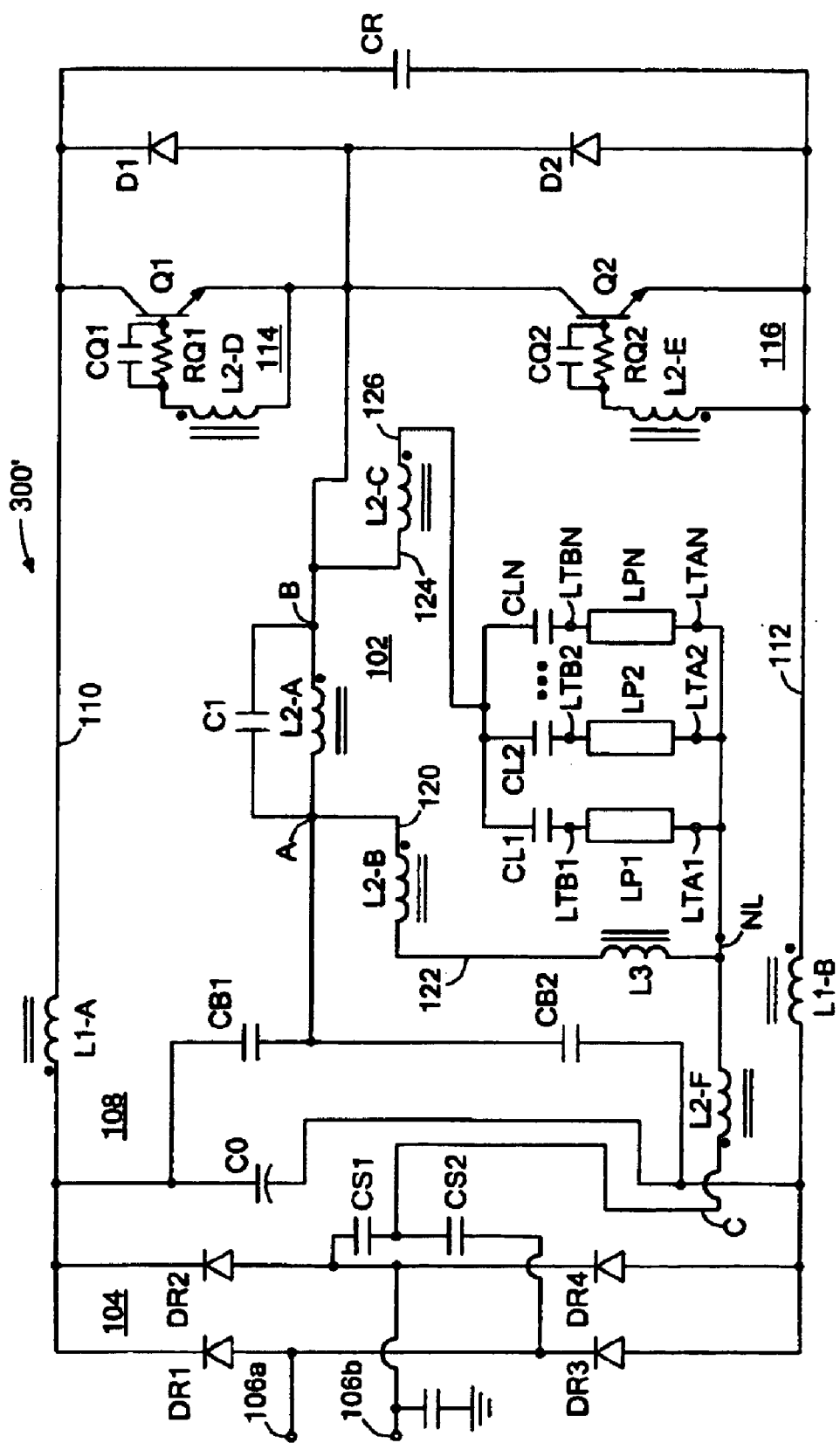
FIG. 7 is a schematic depiction of a further embodiment of resonant circuit having a balanced load feedback path in accordance with the present invention.

FIG. 7 shows a further embodiment of a resonant circuit 300' having similar features to the circuit of FIG. 6 where like reference numbers indicate like elements. The circuit 300' of FIG. 7 includes first and second series capacitors CS1, CS2 coupled end-to-end. The first series capacitor CS1 is coupled to a point between the second and fourth bridge diodes DR2, DR4 and the second series capacitor CS2 is coupled to a point between the first and third bridge diodes DR1, DR3. The feedback secondary winding L2-F is coupled to a point between the first and second series capacitors CS1, CS2. It will be appreciated that operation of this circuit 300' is readily understood in view of the circuit 300 of FIG. 6 and is not repeated.

Figure 8:
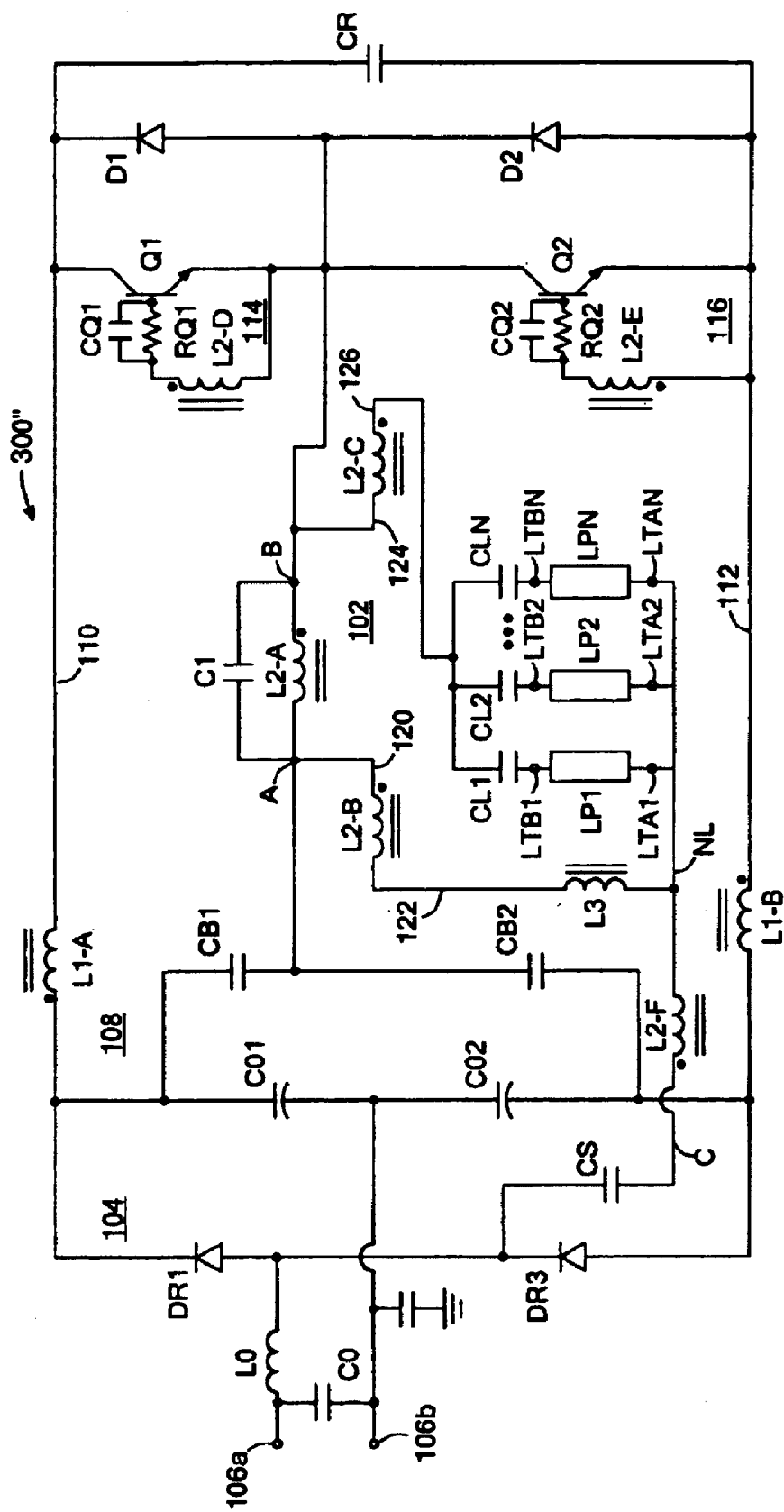
FIG. 8 is a schematic depiction of another embodiment of a resonant circuit having a balanced load feedback path in accordance with the present invention.

FIG. 8 shows a resonant circuit 300" having balanced feedback in a voltage doubler configuration in which like elements have like reference numbers to those in FIG. 6. First and second filter capacitors C01, C02 are coupled end-to-end across the rectifier 104. The series capacitor CS is coupled in series with the feedback secondary winding L2-F of the isolation transformer 102 to form a path from a point between the first and second rectifying diodes DR1, DR3 and the lamp terminal node NL. A balance inductor L3 is located between the first secondary winding L2-B and the lamp terminal node NL. A feedback path is provided from the lamp terminal node NL to the rectifier 104 via the feedback secondary winding L2-F to a point between the first and third diodes DR1, DR3.

The circuit 300" further includes an input inductor L0 couple between the first input terminal 106a and a node between the first and second rectifying diodes DR1, DR3. An input capacitor C0 is connected between the first and second input terminals 106a,b. The L/C arrangement and operation of the input inductor L0 and input capacitor C0 in a voltage doubler circuit are well known to one of ordinary skill in the art.

As described above, in one embodiment the first and feedback secondary windings L2-B, L2-F have impedances that are substantially equal so as to effectively generate voltages that cancel each other. The balance inductor L3 then provides a feedback waveform that is substantially sinusoidal, e.g., corrected, and proportional to the load current. In addition, impedance values for the series capacitor CS and the balance inductor L3 can be selected to generate a series resonance circuit. By adjusting the series resonating affect, the feedback signal can be tweaked in a desired manner for additional correction of the feedback signal.

Figure 9:
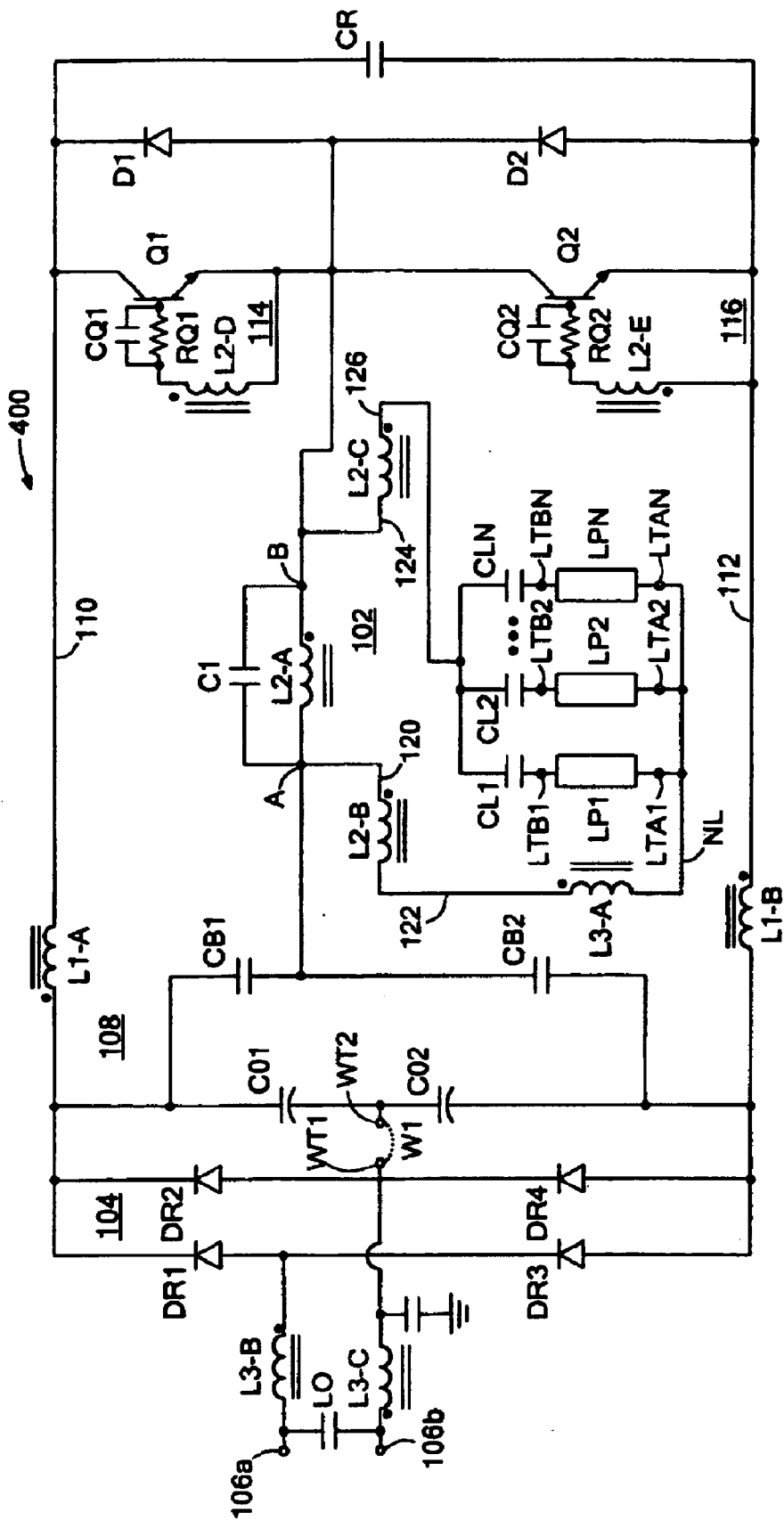
FIG. 9 is a schematic depiction of a resonant circuit having a switchable voltage in accordance with the present invention.

FIG. 9 shows a resonant circuit 400 having an output isolation transformer 102 that can be switched between first and second circuit configurations depending upon the input voltage. In the illustrated embodiment, the circuit 400 can be switched via a circuit jumper W1 between a voltage doubler configuration for a 120 Volt, for example, input signal and a full wave rectifier configuration for a 277 Volt, for example, input signal. It is understood that like reference numbers indicate like elements to those shown FIGS. 6–8.

The circuit 400 includes a balance transformer having first, second and third windings L3-A, L3-B, L3-C that are magnetically coupled. The first winding L3-A is connected between the first secondary winding L2-B of the output isolation transformer 102 and a node NL defined by the lamp terminals LTA1, LTA2, . . . , LTAN. The second balance transformer winding L3-B is coupled between the first input terminal 106a and a point between the first and third rectifying diodes DR1, DR3 of the rectifier bridge 104. The third balance transformer winding L3-C is coupled between the second input terminal 106b and a point between the second and fourth rectifying diodes DR2, DR4. An input capacitor C0 is coupled between the first and second input terminals 106a,b.

The circuit jumper W1 includes a first terminal WT1 located at a point between the second and fourth rectifying diodes DR2, DR4 and a second terminal WT2 located at a point between the first and second filter capacitors C01, C02. If the jumper W1 is ON (a short circuit), the circuit 400 is configured to a voltage doubler arrangement adapted for a first input voltage, e.g., 120 Volts. As can be seen, the closed jumper W1 effectively eliminates the second and fourth rectifying diodes DR2, DR4 from the circuit, by respectively placing them across C01 and C02, thus continuously reverse biasing them. If the jumper W1 is OFF, the circuit 400 has a full wave rectifier configuration.

In general, the voltage across the first winding L3-A, which proportionally corresponds to the load current across the lamps, generates corresponding voltages across the second and third windings L3-B, L3-C. The first winding L3-A provides a proportional relationship between the input signal on the input terminals 106a,b and the load current across the lamps LP1-N. This type of magnetically coupled feedback allows for a simple selection of a voltage doubler or a full wave rectifier configuration by use of the jumper W1, without changing the feedback path.

Figure 9A:
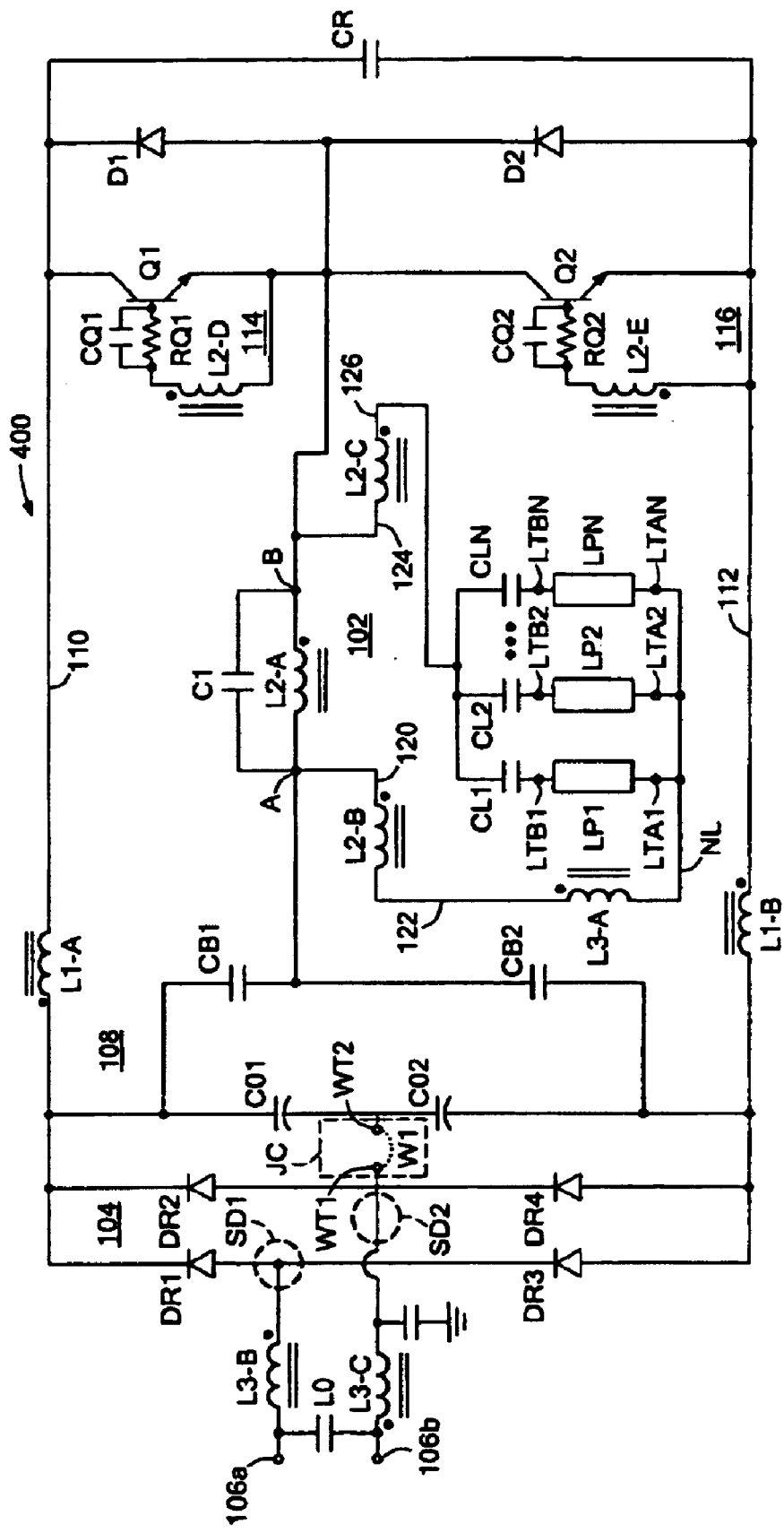
FIG. 9A is a schematic depiction of a resonant circuit having a switchable voltage with signal detection in accordance with the present invention.

In a further embodiment shown in FIG. 9A, the circuit includes a detector including first and second detectors SD1, SD2 for detecting the input voltage level and a jumper control JC for controlling the state of the jumper W1. Based upon the detected voltage level, the circuit is configured to a voltage doubler or full bridge rectifier arrangement. Signal detectors for detecting input signals and jumper control switches are well known to one of ordinary skill in the art. An exemplary signal detector is provided as an Automatic Mains Selector AVS10 device manufactured by ST-Electronics.

Figure 10:
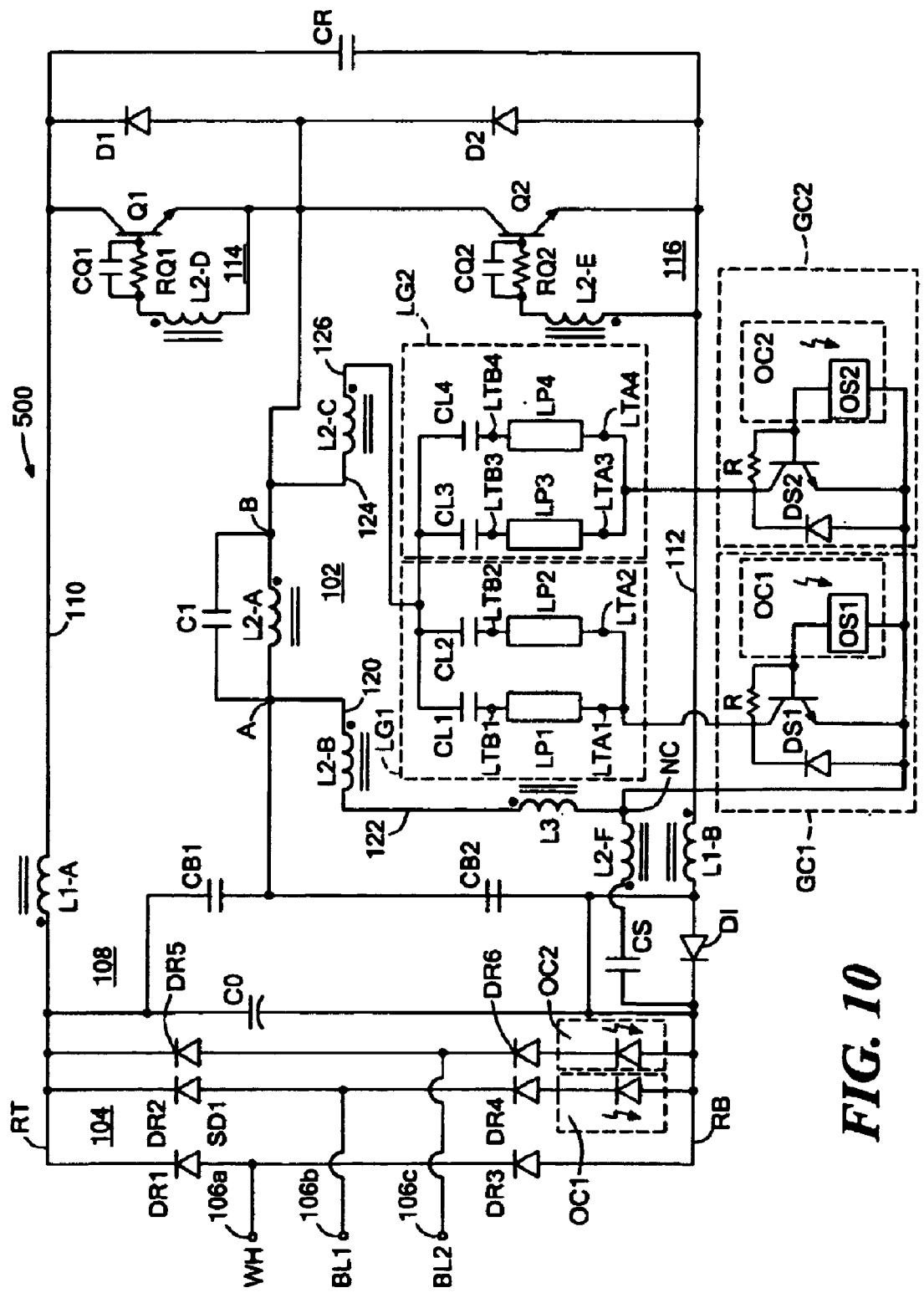
FIG. 10 is a schematic depiction of a resonant circuit having lamp selection in accordance with the present invention.

FIG. 10 shows a resonant circuit 500 having a split output isolation transformer and a lamp selection feature. The circuit 500 includes certain features shown in FIGS. 6–9 in which like reference elements indicate like elements. In general, the circuit 500 provides the ability to independently energize groups of lamps based upon the number of energized input terminals in a single ballast while optimizing THD.

In some states, such as California, it may be required to provide first and second lamp switches for each lighting fixture, which is typically fluorescent lighting. A lighting fixture may include four fluorescent lamps with two lamps in each of two groups of lamps. The first switch turns the first pair of lamps on and off and the second switch turns the second pair of lamps on and off. If a user desires to have all four lamps on for maximum brightness, both switches are flipped to the on position. Typically, a first ballast, controlled by the first switch, energizes the first pair of lamps and a second ballast, controlled by the second switch, energizes the second pair of lamps. It will be appreciated that this conventional arrangement is inefficient and quite costly due to the redundant nature of the circuitry.

The circuit 500 of FIG. 10 includes a resonant circuit having an output isolation transformer 102 having balanced feedback with a lamp selection circuit in accordance with the present invention. A feedback winding L2-F is coupled in series with a series capacitor CS. A balance inductor L3 is coupled between the first secondary winding L2-B of the output isolation transformer 102 and the feedback winding L2-F. In addition to the full wave rectifying diodes DR1-4, the circuit includes fifth and sixth rectifying diodes DR5, DR6 coupled end-to-end across the bridge.

The first input terminal 106a, which can be adapted for connection to a conventional electrical white wire (WH), is connected to a point between the first and third rectifying diodes DR1, DR3. A second input terminal 106b, which can be adapted for connection to a first electrical black wire BL1, is connected to a point between the second and fourth rectifying diodes DR2, DR4. And a third terminal 106c, which can be adapted for connection to a second electrical black wire BL2, is connected to a point between the fifth and sixth rectifying diodes DR5, DR6.

A first signal detector OC1 is connected between the fourth rectifying diode DR4 and a bottom RB of the rectifier 104 and a second signal detector OC2 is connected between the sixth rectifying diode DR6 and the bottom RB of the rectifier. The first signal detector OC1 detects an input signal on the first black input terminal BL1. Similarly, the second signal detector OC2 detects an input signal on the second black terminal BL2.

While the illustrative embodiment shows signal detectors in the form of optical couplers for detecting the presence of an input signal, it is understood that a wide variety of device types can be used to detect the presence of an input signal including a combination of passive and active components and/or magnetically coupled elements.

A first lamp group LG1 includes first and second lamps LP1, LP2 and a second lamp group LG2 includes third and fourth lamps LP3, LP4. It is understood that each lamp group can include any number of lamps and that the circuit can include any number of lamp groups. The first and second lamp groups LG1, LG2 are independently controlled, as described more fully below.

A first lamp group control circuit GC1 is coupled to the lamp terminals LTA1, LTA2 and to a node NC located between the balance inductor L3 and the feedback secondary winding L2-F. In an exemplary embodiment, the first lamp group control circuit GC1 includes a first optical switch OS1 optically coupled to the first signal detector OC1 located in the rectifier 104. The first switch OS1 is coupled to a first electrical switch DS1, here shown as a transistor. The first electrical switch DS1 is ON (conductive) when the first optical switch OS1 is activated by the first signal detector OC1 when an input signal BL1 is present on the second input terminal 106b.

Thus, the first lamp group control circuit GC1 is conductive when the first input signal BL1 is detected on the second input terminal 106b by the first signal detector OC1. The conductive first lamp group control circuit GC1 provides a path for load current through the first lamp group LG1 (the first and second lamps LP1, LP2) so as to energize the lamps when a first switch (not shown) is set to provide the first black wire BL1 signal to the circuit.

Similarly, the second lamp group control circuit GC2 controls the second lamp group LG2 (LP3, LP4). The second lamp group circuit GC2 is conductive when a signal BL2 is detected on the third input terminal 106c by the second signal detector OC2 so as to energize the second lamp group LG2.

While the lamp group control circuits GC1, GC2 are shown having an optical coupler controlling a transistor switch, it will be readily apparent to one of ordinary skill in the art that a variety of device types can be used to achieve the same or similar function. Exemplary devices include magnetically coupled elements and/or suitable combinations of passive and active components.

With this arrangement, a lamp ballast can control groups of lamps independently while providing superior THD and power factor performance due to the balance inductor L3 arrangement. A single ballast can efficiently meet code requirements of multiple switches for controlling groups of lamps.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A resonant circuit, comprising:
   a transformer having a primary winding, a first secondary winding, and a feedback secondary winding, wherein the first secondary winding is electrically connected to the primary winding with a node at AC ground disposed between the first secondary winding and the primary winding; and
   a balance inductor coupled to the first secondary winding, wherein the feedback secondary winding is coupled to the balance inductor such that the feedback secondary winding, the balance inductor and the first secondary winding provide a circuit path, and the feedback secondary winding can provide a feedback path for a feedback signal to an input rectifying circuit.

2. The circuit according to claim 1, further including a first circuit loop that includes the primary winding, the first secondary winding, the balance inductor, at least one pair of lamp terminals for receiving a lamp, and a second secondary winding.

3. The circuit according to claim 1, wherein an AC ground is located between the feedback secondary winding and the input rectifying circuit when the circuit is energized and the load is removed.

4. The circuit according to claim 1, further including a plurality of lamp terminal pairs connected between the primary winding and the balance inductor.

5. The circuit according to claim 1, wherein the feedback signal provides a current that is proportional to a load current.

6. The circuit according to claim 1, wherein a line current remains substantially sinusoidal as a load changes due to removal/addition of lamps.

7. The circuit according to claim 1, wherein the circuit includes a voltage doubler to receive the feedback signal.

8. The circuit according to claim 1, wherein the circuit includes a full wave rectifier circuit to receive the feedback signal.

9. The circuit according to claim 1, further including a series capacitor coupled in series with the feedback secondary winding.

10. The circuit according to claim 9, wherein the series capacitor and the balance inductor provide a series resonant circuit.

11. The circuit according to claim 1, wherein the first secondary winding has an impedance that is substantially equivalent to an impedance of the feedback secondary winding.

12. The circuit according to claim 11, wherein, during circuit operation, voltages across the first secondary winding and the feedback secondary winding substantially cancel each other such that a voltage across the balance inductor is provided to the input rectifying circuit on the feedback path.

13. The circuit according to claim 11, wherein the balance inductor provides a substantially sinusoidal line current waveform.

14. The circuit according to claim 1, further including a first input terminal, a second input terminal for receiving a first input signal, and a third input terminal for receiving a second input signal, a first signal detector for detecting the first input signal, a second signal detector for detecting the second input signal, a first lamp group control circuit coupled to the first signal detector for controlling a first lamp group, a second lamp group control circuit coupled to the second signal detector for controlling a second lamp group, wherein the first and second lamp control circuits independently control the respective first and second lamp groups based upon a presence of the respective first and second input signals.

15. The circuit according to claim 14, wherein the first lamp control circuit is coupled to the balance inductor.

16. The circuit according to claim 15, further including a single ballast adapted for coupling to first and second lamp switches to independently control the first and second lamp groups.

17. A lamp ballast circuit, comprising:
   a resonant inverter including
   a transformer having a primary winding, a first secondary winding and a feedback secondary winding, wherein the primary winding corresponds to a resonant inductive element of the resonant inverter, the first secondary winding being electrically coupled to an end of the primary winding such that voltages on the primary winding and the first secondary winding are adapted for being additively applied across a load; and a balance inductor coupled between the first secondary winding and the feedback secondary winding, wherein the feedback secondary winding is adapted to provide a feedback signal on a feedback path to an input rectifying circuit.

18. The ballast according to claim 17, wherein the first secondary winding the feedback secondary windings have substantially equivalent impedances to cancel respective voltages.

19. The ballast according to claim 17, wherein the balance inductor provides a substantially sinusoidal waveform to the input rectifying circuit.

20. The ballast according to claim 17, further including a plurality of lamp terminal pairs coupled between a second secondary winding and the balance inductor.

21. The ballast according to claim 17, further including a first circuit loop having the primary winding, the first secondary winding, the balance inductor, a plurality of lamp terminal pairs connected in parallel, and a second secondary winding.

22. The ballast according to claim 21, further including a first circuit path extending from the rectifier circuit through a series capacitor and the feedback secondary winding, wherein the feedback secondary winding is connected to the balance inductor.

23. A method of providing feedback in a resonant circuit, comprising:

connecting in a first circuit loop a primary winding, a first secondary winding, a balance inductor, and at least a pair of lamp terminals; and connecting a feedback secondary winding to a rectifier circuit to provide a feedback signal on a feedback path from the first circuit loop to the rectifier circuit.

24. The method according to claim 23, further including providing a THD of less than about 10 percent.

25. The method according to claim 23, further including connecting a series capacitor in the feedback path.

26. The method according to claim 23 further including providing an AC ground at a point between the rectifier and the feedback secondary winding, whenever the circuit is activated and the load is removed.

27. The method according to claim 23, further including providing a voltage doubler configuration for the rectifier circuit.

28. The method according to claim 23, further including selecting respective impedances for the first and feedback secondary windings that substantially cancel each other.

29. The method according to claim 28, further including selecting an impedance for the balance inductor to generate a substantially sinusoidal signal on the feedback path.

30. The method according to claim 23, further including coupling a first lamp group control circuit to the first circuit loop to control a first group of lamps.

31. The method according to claim 30, further including coupling a second lamp group control circuit to the first circuit loop to control a second group of lamps independently from the first group of lamps.

32. The method according to claim 31, further including providing a first signal corresponding to a presence of a signal on a first input terminal to the circuit to the first lamp group control circuit.

33. The method according to claim 32, further including providing a second signal corresponding to a presence of a signal on a second input terminal to the circuit to the second group control circuit.

34. A method of providing feedback in a ballast, comprising:

providing a resonant circuit including a resonant inductive element having a primary winding with first and second ends;

providing a first secondary winding having first and second ends and coupling the first end of the primary winding to the first end of the first secondary winding;

providing a second secondary winding having first and second ends and coupling the second end of the primary winding to the first end of the second secondary winding;

providing a balance impedance having first and second end and coupling the first end of the balance inductor to the second end of the first secondary winding;

providing a third secondary winding having first and second ends and coupling the second end of the third secondary winding to the second end of the balance impedance, wherein the first end of the third secondary winding is adapted for coupling to a rectifier circuit to provide a feedback signal;

providing at least one pair of lamp terminals comprising first and second lamp terminals to energize a lamp and coupling the second lamp terminal to the second end of the balance inductor and coupling the first lamp terminal to the second end of the second secondary winding.

35. The method according to claim 34, further including providing a first AC ground at the first end of the primary winding.

36. The method according to claim 35, further including providing a second AC ground at the first end of the third secondary winding, whenever the circuit is activated and the load removed.

* * * * *